United States Patent [19]

Plaquin

[11] Patent Number: 4,515,020
[45] Date of Patent: May 7, 1985

[54] METHOD AND APPARATUS FOR ENSURING CORRECT THREAD MAKE-UP OF A PIPEJOINT

[75] Inventor: Bernard Plaquin, Aulnoye Aymeries, France

[73] Assignee: Vallourec, Paris, France

[21] Appl. No.: 469,173

[22] Filed: Feb. 23, 1983

[51] Int. Cl.³ ............................................. G01N 5/00
[52] U.S. Cl. ..................................................... 73/761
[58] Field of Search .................................. 73/761, 770

[56] References Cited

U.S. PATENT DOCUMENTS

| | | | |
|---|---|---|---|
| 3,974,685 | 8/1976 | Walker | 73/761 |
| 4,008,773 | 2/1977 | Wallace et al. | 73/761 |
| 4,023,406 | 5/1977 | Benz | 73/761 |
| 4,027,530 | 6/1977 | Tambini et al. | 73/761 |
| 4,104,778 | 8/1978 | Vliet | 73/761 |
| 4,106,176 | 8/1978 | Rice et al. | 73/761 |
| 4,361,945 | 12/1982 | Eshghy | 73/761 |

*Primary Examiner*—Anthony V. Ciarlante
*Attorney, Agent, or Firm*—Arnold, White & Durkee

[57] ABSTRACT

A method and device for ensuring correct assembly of screwed pipejoints having at least one stop. During assembly the screwing torque is measured continuously, the value of the second differential of the screwing torque is determined uninterruptedly, and the maximum of this second differential is checked to exceed a predetermined value.

The device includes in combination: a means of converting into electric voltage the value of the tightening torque applied at every instant during the assembly of the joint, an electronic device for carrying out the calculation of the second differential of the curve of electric voltage so measured, and a device enabling the value of this second differential to be compared with a reference value for giving a signal when the maximum of the second differential exceeds or does not exceed the reference value.

6 Claims, 10 Drawing Figures

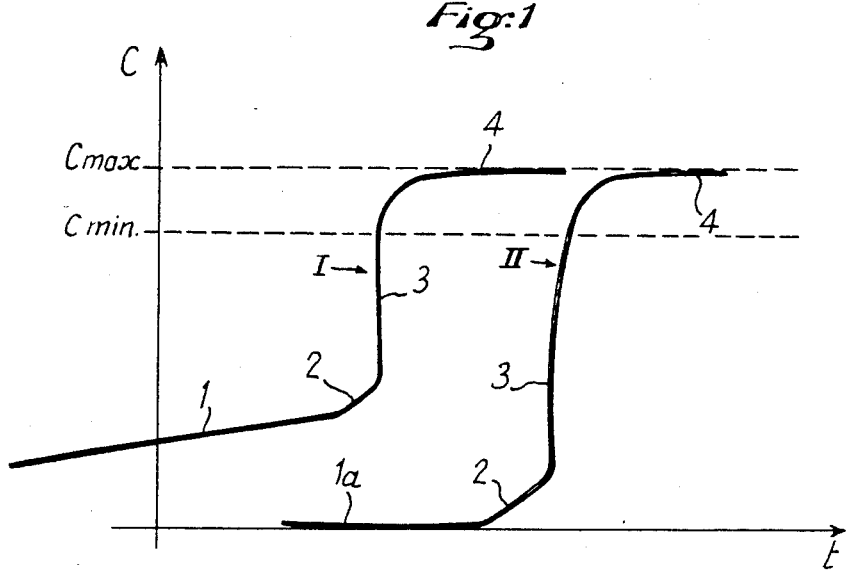
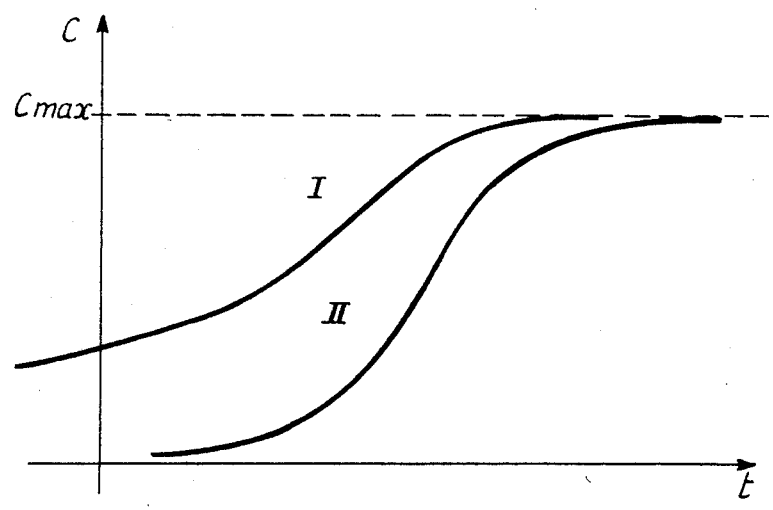

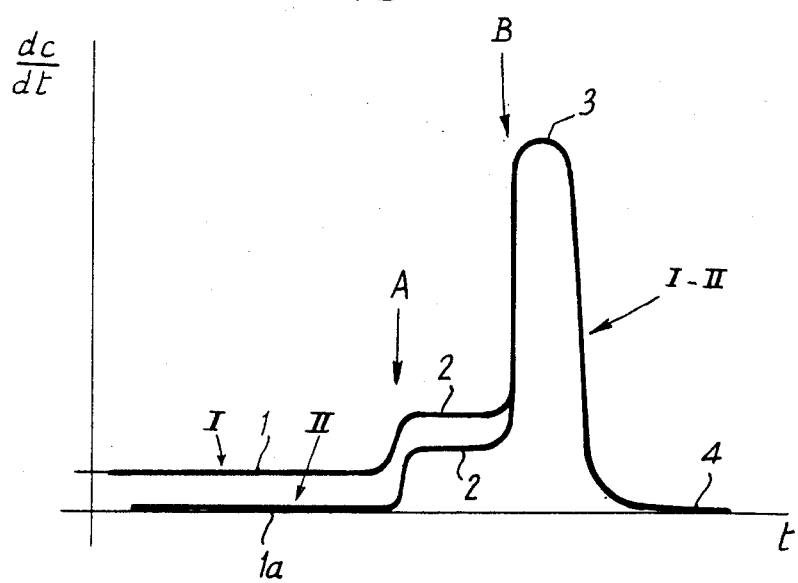
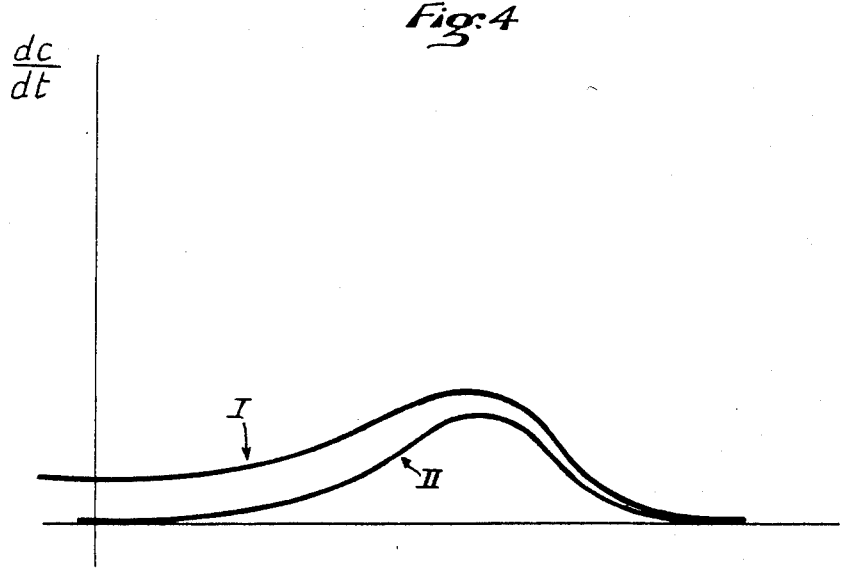

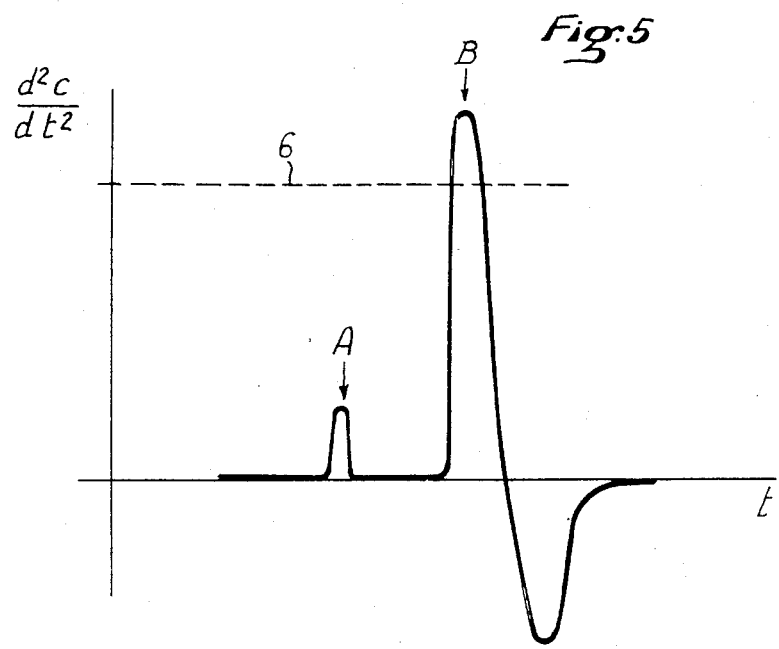
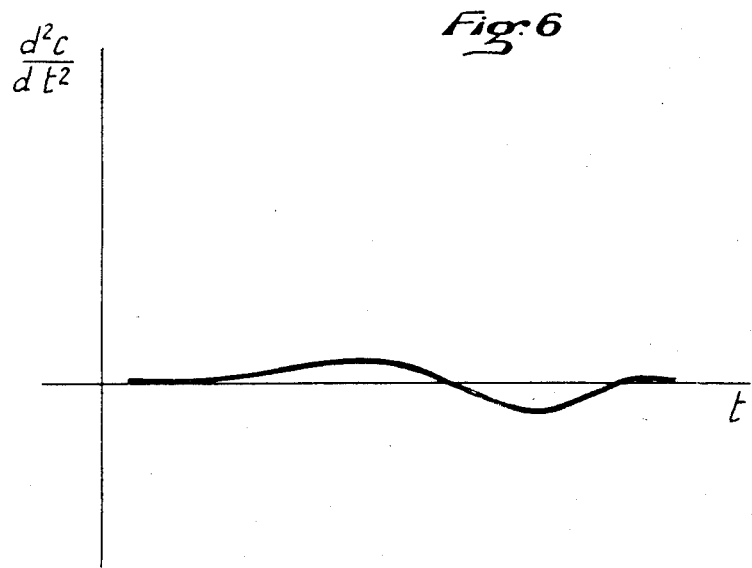

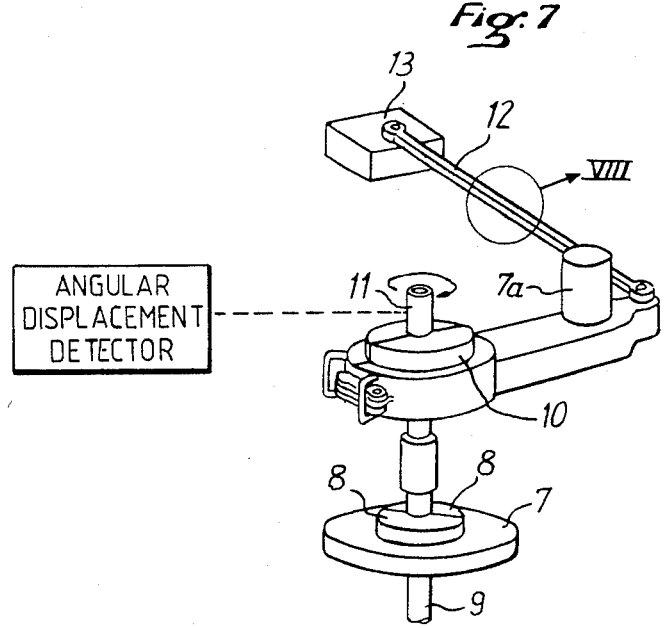
Fig. 7
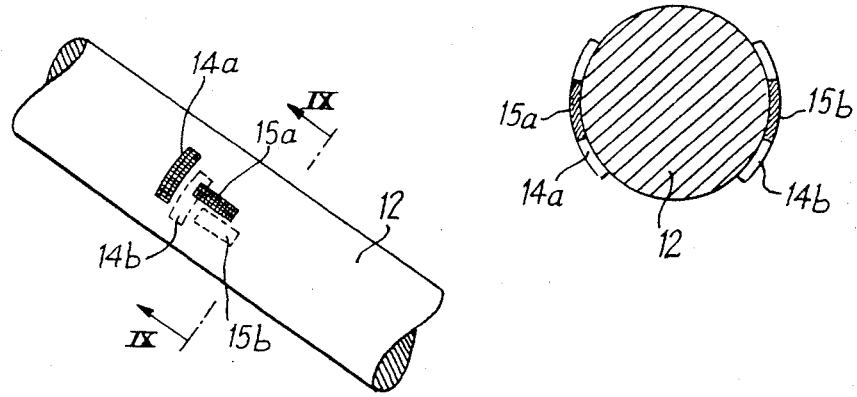
Fig. 8
Fig. 9

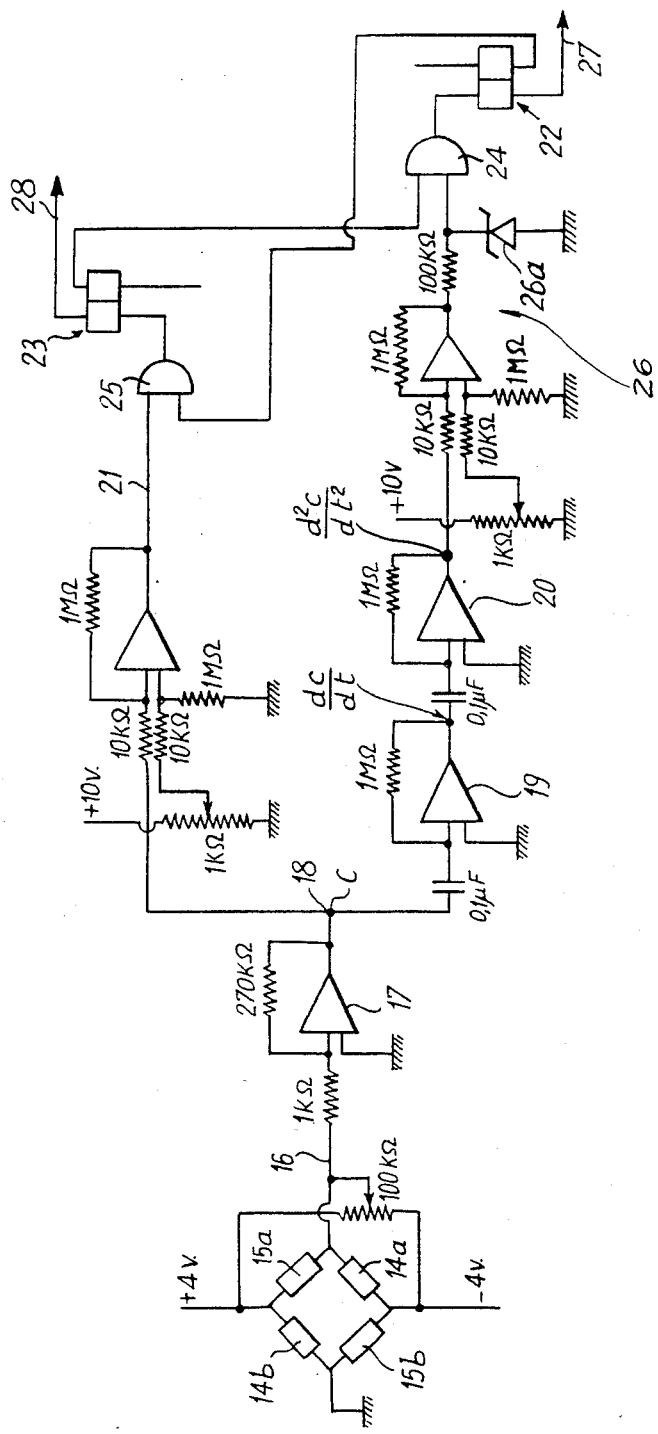

METHOD AND APPARATUS FOR ENSURING CORRECT THREAD MAKE-UP OF A PIPEJOINT

FIELD OF THE INVENTION

The present invention relates to a new and improved method and apparatus for determining that the make-up of the threads of a threaded pipejoint having at least one stop, is carried out correctly.

BACKGROUND OF THE INVENTION

Known threaded pipejoints, which are employed in particular in the oil industry and especially in oil wells, have tapered or cylindrical threads as well as at least one stop integral with one of the members in order to restrict the thread make-up at the time of the assembly of the two members.

The idea is equally well known of effecting the assembly of such joints by applying a torque which lies within a zone of predetermined values, the torque being applied by a device which enables it to be measured.

Prior mehods have not entirely given satisfaction because it may occur that by reason, for example, of the presence of a foreign body such as a chip of metal in the lubricant on the threads, or in consequence of a seizure at the level of the threads, the predetermined maximum torque is reached as a result of abnormally high resistance to make-up and without the surfaces of the stop for restriction of the threading, coming correctly into contact with one another. The result is defective tightening of the joint because under this assumption the sealing surfaces are in general not in contact or are in contact only in an unsatisfactory way.

A general object of the present invention is to provide a new method and apparatus which enable these disadvantages to be eliminated in a simple manner and at low cost.

SUMMARY OF THE INVENTION

This and other objects are attained in accordance with the present invention through the provision of a a method and apparatus for ensuring correct assembly of threaded pipejoints having at least one stop for restricting threaded make-up, characterized by the fact that during threaded make-up the screwing torque is measured continuously as a function of the time, that the value of the second differential of the torque is determined uninterruptedly with respect to time, and that the maximum of this second differential is ascertained to exceed a predetermined value.

In a particular highly improved mode of putting into effect the method in accordance with the invention, it is likewise ascertained during make-up that the torque does not exceed the prescribed minimum nominal value before the second differential of the torque exceeds the value predetermined for this differential. It is thus also ensured that when the nominal torque has been reached, the maximum of the second differential of the torque, which has been found, was not due to another aberrant phenomenon which might occur after the normal process of making up the joint.

The method may be effected in accordance with the present invention by measuring the torque exerted on the two pipe members by means, for example, of a pick-up consisting of strain gauges which enables the value of the torque exerted on the two pipe members to be converted instantaneously into the form of an electric voltage.

An electronic device of known type enables the second differential with respect to time to be calculated in real time from the voltage curve thus obtained, and it is sufficient to compare the value of this second differential with a threshold value in order to determine whether the maximum of this curve does or does not exceed the predetermined threshold.

In order to ensure that in accordance with the particular method described above, the make-up torque reaches its minimum nominal value after the maximum of its second differential, one may, for example, feed a flipflop system by means of two AND gates which receive voltages which correspond with the excess of the torque and of its second differential with respect to their threshold values.

In a variant upon the present invention one measures permanently the make-up torque and the second differential of the latter, not with respect to time but with respect to the angular displacement of one of the members with respect to the other during thread make up.

This rotation or angular displacement may easily be measured thanks to devices of known types which enable a given number of electrical pulses to be generated, which are directly proportional to the rotation of one pipe member with respect to the other.

The differential of the torque with respect to the angular displacement is then equal to the difference between the torques measured at the instants of two consecutive pulses and the second differential is equal to the difference between the first differentials from two consecutive pulse intervals. These various calculations may easily be achieved with a micro-processor or mini-micro computer of known type.

The results of experiments which have been made by the assignee of the present invention have illustrated that this method enables a perfectly reliable determination to be made of whether a pipejoint having a stop for restricting thread make up has been correctly threaded, that is to say, whether the tightening torque which has been exerted during make up is due to the normal operation of the joint or whether it is due to an accident in operation such as a seizure or the presence of a foreign body at the level of the threads.

In fact in general the torque necessary for the tightening of a pipejoint of this type increases progressively rather slowly when the thread is tapered or conical (or remains substantially constant when the thread is cylindrical) and then increases during a short period, with a rather low proportionality at the time of the approach of the sealing surfaces, after which the torque increases abruptly when the surfaces for restricting make up come into contact. This is the case at least when the tightening of the joint is carried out under normal conditions.

The result is that when the surfaces for restricting make up come into contact, an abrupt variation occurs in the slopes, that is to say, in the first differential of the curve of the torque, which appears as a high value of the second differential of the torque.

On the other hand, when the tightening of the joint is carried out in an abnormal manner, the torque increases in a substantially progressive manner which does not bring about any abrupt variation in the differential of the torque, which is shown by values of the second differential which are always relatively low.

Under these conditions it may be seen that by measuring the maximum value of the second differential of the torque with respect to time, or with respect to the angular displacement of one member with respect to the other, it may be determined in a simple manner whether the joint has been correctly made up.

The object of an present invention is also to provide a new apparatus for carrying out the method defined above, the apparatus being characterized by the fact that it includes in combination: a means of converting into electric voltage the value of the tightening torque applied at every instant during the make up of the joint, an electronic means for carrying out the calculation of the second differential of the curve of electric voltage so measured, and means enabling the value of this second differential to be compared with a reference value for giving a signal when the maximum of the value of the second differential does not exceed the reference value, which provides an indication of defective tightening of the joint.

In a preferred embodiment the make-up torque is compensated by a connecting rod connected to a fixed point, the axial forces exerted upon the connecting rod enabling the value of the torque to be determined.

The apparatus enabling the torque to be converted into electric voltage may be of known type and may, for example, utilize strain gauges which in the particular embodiment described above are located on the connecting rod. Similar devices are already known which by means of an amplifier, a capacitor and a resistor enable the differential of a voltage to be obtained with respect to time. The employment of two such devices in succession enables the second differential to be obtained.

BRIEF DESCRIPTION OF THE DRAWINGS

With the aim of permitting the invention be better understood, there will now be described by way of illustration and not limitation an embodiment taken as an example and represented in the drawing attached.

In this drawing:

FIG. 1 is a graph which represents diagrammatically the normal development of the screwing torque as a function of time, firstly for a joint having conical threads and secondly for a joint having cylindrical threads;

FIG. 2 is similar to FIG. 1 but shows the case in which the thread make up is carried out in an abnormal manner;

FIGS. 3 and 4 are graphs which represent the curves of the first differentials with respect to time, of the torques represented respectively in FIGS. 1 and 2;

FIGS. 5 and 6 are graphs that represent the second differentials with respect to time, of the make-up torques represented in FIGS. 1 and 2;

FIG. 7 shows somewhat schematically a device enabling the performance of the method in accordance with the invention;

FIG. 8 is a view on a larger scale of the portion VIII of FIG. 7;

FIG. 9 is a section along IX—IX in FIG. 8; and

FIG. 10 is a wiring diagram of an electronic device which enables the method in accordance with the invention to be performed.

DETAILED DESCRIPTION OF A PREFERRED EMBODIMENT

In FIG. 1 are shown the curves I and II which represent the development of the value of the tightening torque of a joint as a function of time.

The curve I corresponds with the case of a joint having a conical thread giving a force fit, and which has sealing surfaces which come into contact before the stop surfaces for restricting make-up come into contact.

Thus the curve I exhibits a slightly rising portion 1 which corresponds with the increase in the torque due to the engagement of the conical threads on the male member in those on the female member.

The portion 2 of the curve indicates an increase in the contact pressure of the sealing surfaces, whereas the portion 3 of the curve, which rises very rapidly, indicates the phase in which the surfaces for restricting make-up come to a stop against one another.

The portion 4 provides an indication of the maximum value $C_{max}$ of the screwing torque which is effectively applied.

In the curve II which applies to a joint having a cylindrical thread the same portions of curves 2, 3 and 4 are found again, which correspond with the tightening in succession of the sealing surfaces and of the surfaces for restricting make up. However, taking into account the fact that the cylindrical threads do not exert any force fit, the portion 1a of the curve II remains flat, whereas the portion 1 of the curve I which corresponds with conical threads rises slightly.

In FIG. 2 the curves are shown which applies to the tightening of the same types of threaded pipe joints as FIG. 1 but under the assumption that the make-up is carried out under abnormal conditions by reason either of seizure of the threads or else, for example, of the presence of a foreign body in the threads.

Under these conditions it will be observed that the curve of the torque with respect to time appears in the general shape of an elongated S which is due to the fact that the seizure or the foreign body causes a relatively steady increase in the tightening torque so that the different portions 1, 2, 3 or 1a, 2 and 3 have practically disappeared.

In FIG. 3 the curve is shown of the differential of the torque with respect to time, corresponding with each of the curves I and II in FIG. 1.

It will be observed that the portion 1 of the curve I in FIG. 1 corresponds with the horizontal portion 1 in FIG. 3 (curve I), that the portion 2 of the curve I in FIG. 1 corresponds with the horizontal portion 2 in FIG. 3, that the portion 3 of the curve I in FIG. 1 corresponds with the maximum 3 in FIG. 3 and, that the horizontal portion 4 of the maximum torque from curve I in FIG. 1 corresponds with the portion 4 in FIG. 3.

The curve II in FIG. 3 has a trend similar to that of the curve I, the only difference being due to the fact that the horizontal portion 1a has zero value whereas the horizontal portion 2 of the curve II is in this embodiment at a lower level than that of the curve I.

It clearly may be seen that the portions 1 or 1a in FIG. 1 which are connected at an angle to the portions 2 which in turn are connected at an angle to the portions 3 give successive horizontal portions to the curves of the differentials in FIG. 3.

On the other hand, by reason of the absence of abrupt variations in the torque in the curves from FIG. 2, it may be observed in FIG. 4 that the first differentials of the torque with respect to time vary continuously and with the general shape of a curve having a very much rounded maximum when an accident occurs during tighten up of the joint.

In FIG. 5 is shown the curve for the second differential with respect to time, of the curves representing the thread tightening torques in FIG. 1.

It may be observed from this FIG. 5 that the zones A and B of rapid variation in the value of the first differential in FIG. 3, correspond with peaks in the curve of the second differential in FIG. 5 in the case of correct make-up.

It may be observed on the other hand that the second differential of the torque with respect to time, which is represented in FIG. 6 in the case of abnormal tightening of the joint due, for example, to seizure of the threads or to the presence of a foreign body with the threads, appears in a very flattened wavy shape.

Under these conditions it may be seen that by measuring the value of the peak B of the curve of the second differential in FIG. 5, and by comparing this value with a reference value indicated, for example, by the dotted line 6, it is possible to determine with accuracy whether the make-up of the joint has been carried out under normal conditions or not.

In FIG. 7 which represents schematically an apparatus for performing the method of the present invention into effect, the conventional devices for the tightening of the joints on a wellhead are found, which includes a rotary table 7 equipped with slips or jaws 8 capable of gripping the upper portion 9 of the pipe and a device 10 having revolving jaws which may be brought with gripping engagement with the lower portion of the pipe 11 and drive it in rotation by means of a motor 7a through a known device which is not shown.

For performing the method in accordance with the invention, and in a quite conventional manner, the rotary table 7 is fixed against rotation and the driving of the portion 11 of the pipe in rotation by the motor 7a and by the revolving jaws 10, tends to make the assembly supporting the jaws 10 and the motor 7a revolve about the axis of the pipe with a torque equal to the make-up torque. In order to avoid rotation of the whole of the device, it is connected by a connecting rod 12 to a fixed portion 13.

In accordance with a particular embodiment of the apparatus in accordance with the present invention, the measurement of the torque is carried out by means of strain gauges located upon the connecting rod 12 as schematically shown in FIG. 7.

It is shown on a larger scale in FIGS. 8 and 9 how four strain gauges 14a, 14b and 15a, 15b are arranged by pairs circumferentially and longitudinally on the connecting rod 12.

It is known that by measuring the variation of the electrical resistances of these four strain gauges it is possible to determine the longitudinal stresses which are applied to the connecting rod 12 and which are directly proportional to the screwing torque exerted by the revolving jaws 10 on the lower portion of the joint 11, the upper portion of the joint 9 being fixed by the jaws 8.

FIG. 10 represents an embodiment of an electronic device which enables it to be determined from the indications which are supplied to it by these strain gauges 14 and 15, whether the make up of the joint has been carried out under normal conditions or not.

In FIG. 10 the strain gauges 14a, 14b and 15a, 15b are found again, which are mounted conventionally. A variable resistor of 100 kilo-ohms enables the voltage at the point 16 to be adjusted to zero when the torque is zero. The supply voltage and the dimensions of the connecting rod 12 are such that in the embodiment described the voltage at the point 16 is about 10 millivolts for a torque of 1000 meter-kilos. An amplifier 17 enables a voltage to be obtained at the point 18 of about 2 volts for a torque of 1000 meter-kilos. This voltage is proportional to the torque C.

A device 19 consisting of an amplifier associated with a capacitor enables the differential dC/dt of the torque to be obtained, and then a second device 20 consisting of an amplifier associated with a capacitor enables the second differential of the torque $d^2C/dt^2$ to be obtained.

A device 26 including an amplifier and a variable resistor enables an adjustable threshold to be determined, corresponding with the value 6 in FIG. 5, and a voltage to be applied to the AND gate 24, corresponding with the excess of the second differential with respect to the adjustable threshold value, this voltage being in turn subjected to an amplitude limiter 26a.

In parallel, a conventional device including in particular an amplifier and a variable resistor of 1 kilo-ohm, enables a voltage to be obtained at 21 which is equal to the excess of the instantaneous value of the make-up torque with respect to the value of the minimum nominal torque to which the joint must be tightened, the variable resistor enabling this latter value to be adjusted.

By means of a conventional device including two flipflops 22 and 23 which are fed through two AND gates 24 and 25, the gate 24 receives the voltage corresponding with the excess of the second differential with respect to the reference threshold, whereas the gate 25 receives the voltage which corresponds with the excess of the tightening torque with respect to the minimum nominal torque.

This known device comprising flipflops enables a signal to be obtained at 27 at the end of the threaded tightening operation, solely when the second differential reaches its threshold value (6, FIG. 5) before the minimum nominal torque (Cmin, FIG. 1) has been reached. In the opposite case (minimum nominal torque before the peak of the second differential) a signal is emitted at 28.

Thus at 27 a signal is obtained enabling a display that the make-up has been carried out correctly, and at 28 a signal enabling a display that the make-up has been carried out in an abnormal manner.

It may be seen that the apparatus in accordance with the present invention, of which a particular embodiment has just been described, enables the method to be performed with simple means, for determining whether the make up of a joint of the type described above has been carried out under satisfactory conditions.

It goes without saying that the embodiments which have been described above are given purely by way of indication, and that they might be subjected to any desirable modifications without thereby departing from the scope of the invention.

There exists in fact numerous means which enable a torque to be measured instantaneously and the second differential of it to be calculated. It is clear that the employment of other devices or equivalent means would not depart from the scope of the invention. In particular it is clear that in accordance with the invention it is not indispensable to determine that the tightening torque exceeds its minimum nominal value after the peak in the implementation described above.

Similarly the invention is in no way restricted to a particular type of pipe joint, and it is sufficient in order to be able to perform the method which has been described, that the joint includes stops for restricting make-up, which during normal tightening cause an abrupt increase in the applied torque.

I claim:

1. A method for ensuring correct tightening of the two members of a threaded pipe joint having at least one torque limiting shoulder, comprising the steps of:

applying a torque to one of said members relative to the other;

measuring continuously said torque and providing a signal indicative thereof;

providing a signal indicative of time;

providing a signal representative of the instantaneous torque gradient of the torque-time curve;

providing a signal representative of the rate of change of said gradient of said torque-time curve; and comparing with a predetermined value the maximum value of said signal representative of the rate of change of said gradient in order to ensure that said maximum value exceeds said predetermined value.

2. A method of ensuring correct tightening of the two members of a threaded pipe joint having at least one torque limiting shoulder, comprising the steps of:

applying a torque to one of said members relative to the other;

measuring continuously said torque and providing an output signal indicative thereof;

providing a signal indicative of the relative rotation of said members in response to said torque;

providing a signal representative of the instantaneous torque gradient of the torque-rotation curve; providing a signal representative of the rate of change of said gradient of said torque-rotation curve and comparing with a predetermined value the maximum value of said signal representative of the rate of change of said gradient in order to ensure that said maximum value exceeds said predetermined value.

3. The method according to claim 1 or claim 2 comprising the further step of comparing the maximum value of said torque with the nominal minimum torque value at which the pipe joint should be tightened in order to ensure that said nominal torque value is exceeded by said maximum torque value.

4. The method of claim 3 comprising the additional steps of:

determining the instant at which the torque applied to said members exceeds its nominal minimum value; and determining the instant at which the maximum value of the rate of charge of said gradient takes place in order to ensure that said first-mentioned instant is earlier in time than said second-mentioned instant.

5. Apparatus for ensuring correct tightening of two members of a threaded pipe joint having at least one torque limiting shoulder, comprising:

means for applying a torque to one of said members relative to the other;

means for continuously converting the value of said torque into a voltage signal;

means for determining continuously the rate of change of the gradient of said voltage signal;

means for comparing the said rate of change with a predetermined reference value; and means for indicating if said predetermined reference signal is exceeded by the maximum of said rate of change.

6. The apparatus of claim 5 wherein said torque applying means is connected to a fixed point by a coupling member, and strain gauge means on said coupling member for generating a signal proportional to the axial forces transmitted by said coupling member to enable a determination to be made of the torque applied to said joint member.

* * * * *